(12) United States Patent  
Silverbrook

(10) Patent No.: US 7,289,727 B2  
(45) Date of Patent: *Oct. 30, 2007

(54) IMAGE PROCESSOR WITH INTEGRATED PRINTING

(75) Inventor: Kia Silverbrook, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 60 days.

This patent is subject to a terminal disclaimer.

(21) Appl. No.: 10/309,025

(22) Filed: Dec. 4, 2002

(65) Prior Publication Data

US 2003/0063908 A1   Apr. 3, 2003
US 2007/0058969 A9   Mar. 15, 2007

Related U.S. Application Data

(63) Continuation of application No. 09/942,601, filed on Aug. 31, 2001, which is a continuation-in-part of application No. 09/436,750, filed on Nov. 9, 1999, now Pat. No. 6,539,180.

(30) Foreign Application Priority Data

Nov. 9, 1998   (AU) ....................................... PP7017

(51) Int. Cl.
*G03B 17/48* (2006.01)
*G03B 17/50* (2006.01)
(52) U.S. Cl. ........................................ 396/429; 396/30

(58) Field of Classification Search ................ 355/40, 355/71; 396/429, 33, 30, 430, 374; 358/906; 347/1, 20, 108, 2; 348/207.2, 231, 233, 374, 348/207.99
See application file for complete search history.

(56) References Cited

U.S. PATENT DOCUMENTS 4,333,088 A     6/1982 Diggins
(Continued)

FOREIGN PATENT DOCUMENTS

EP          0706893 B1     4/1996
(Continued)

*Primary Examiner*—Peter B. Kim

(57) ABSTRACT

An apparatus for recording and generating images includes a printing unit. The printing unit includes a carrier that is dimensioned to approximate a PCMCIA memory card. A media supply is receivable in the carrier. A page width print head assembly is mounted in the carrier to print images on the media. The page width print head assembly includes at least one print head chip and a suitable printing microprocessor that is configured to control operation of the print head chip. An ink supply mechanism is operatively arranged with respect to the print head assembly to supply the print head assembly with ink. A media feed mechanism is positioned in the carrier to feed media to and from the print head chip. The apparatus includes an image recordal apparatus that includes a housing in which the carrier is received. The housing is dimensioned to define a sleeve for the carrier so that at least half the carrier is received in the housing. An image sensing device is positioned on the housing to sense an image to be generated. An image sensing microprocessor is positioned in the housing and is operatively arranged with respect to the image sensing device to control operation of the image sensing device. Both the printing unit and the image recordal apparatus have complementary releasable data connectors so that the image sensing microprocessor can communicate image data to the printing microprocessor of the printing unit.

10 Claims, 11 Drawing Sheets

U.S. PATENT DOCUMENTS

| | | |
|---|---|---|
| 4,683,481 A | 7/1987 | Johnson |
| 5,077,565 A | 12/1991 | Shibaike et al. |
| 5,132,707 A | 7/1992 | O'Neill |
| 5,144,340 A | 9/1992 | Hotomi et al. |
| 5,367,324 A | 11/1994 | Abe et al. |
| 5,467,118 A | 11/1995 | Gragg et al. |
| 5,489,930 A | 2/1996 | Anderson et al. |
| 5,493,409 A | 2/1996 | Maeda et al. |
| 5,559,932 A | 9/1996 | Machida et al. |
| 5,764,258 A | 6/1998 | Hetzer et al. |
| 5,792,249 A | 8/1998 | Shirosha et al. |
| 5,802,413 A | 9/1998 | Stephenson |
| 5,847,836 A | 12/1998 | Suzuki |
| 5,848,420 A | 12/1998 | Xu |
| 5,949,467 A | 9/1999 | Gunther et al. |
| 5,992,994 A | 11/1999 | Rasmussen et al. |
| 5,995,772 A | 11/1999 | Barry et al. |
| 6,007,195 A * | 12/1999 | Kokubo .................. 347/108 |
| 6,104,430 A | 8/2000 | Fukuoka |
| 6,149,256 A | 11/2000 | McIntyre et al. |
| 6,154,254 A * | 11/2000 | Hawkins et al. ............ 348/374 |
| 6,155,669 A | 12/2000 | Donahue et al. |
| 6,158,906 A | 12/2000 | Simon et al. |
| 6,158,907 A | 12/2000 | Silverbrook |
| 6,188,430 B1 | 2/2001 | Motai |
| 6,196,739 B1 | 3/2001 | Silverbrook |
| 6,229,565 B1 * | 5/2001 | Bobry .................. 348/207.99 |
| 6,234,389 B1 | 5/2001 | Valiani et al. |
| 6,362,868 B1 | 3/2002 | Silverbrook |
| 6,539,180 B1 | 3/2003 | King |
| 6,543,880 B1 | 4/2003 | Akhavain et al. |
| 6,906,778 B2 | 6/2005 | Silverbrook |
| 7,154,580 B2 * | 12/2006 | Silverbrook ................. 355/40 |

FOREIGN PATENT DOCUMENTS

| | | |
|---|---|---|
| EP | 0848540 A | 6/1998 |
| JP | 09-113990 A | 5/1997 |
| WO | WO95/10810 | 4/1995 |
| WO | 97/04353 A | 2/1997 |
| WO | 97/50243 A | 12/1997 |
| WO | WO 2000/28379 A | 5/2000 |

* cited by examiner

IMAGE PROCESSOR WITH INTEGRATED PRINTING

CROSS-REFERENCES TO RELATED APPLICATIONS

This application is a Continuation Application of U.S. application Ser. No. 09/942,601, filed on Aug. 31, 2001, which is a Continuation-in-Part of U.S. application Ser. No. 09/436,750, filed on Nov. 09, 1999, now issued U.S. Pat. No. 6,539,180.

FIELD OF THE INVENTION

This invention relates to an image recordal and generation apparatus.

BACKGROUND OF THE INVENTION

The Applicant has developed print head assemblies that are capable of generating images having a resolution of up to 1600 dpi. Furthermore, the print head assemblies that the Applicant has developed are of a relatively small size, allowing them to be incorporated into a camera-based device such as that described in U.S. patent application Ser. No. 09/113,053.

Details of such a print head assembly can be found in U.S. patent application Ser. No. 09/113,053. The relatively small size has been largely the result of the development of an ink jet print head that is the subject of U.S. patent application Ser. No. 09/425,419.

The ink jet print head has allowed the Applicant to develop a compact portable printer that is directly engageable with a PCMCIA slot in a laptop or notebook computer. This compact portable printer is the subject matter of the above referenced U.S. patent application Ser. No. 09/436,509.

The Applicant has identified that it would be highly desirable to provide an image recordal and generation assembly or apparatus that is capable of generating the high-resolution images mentioned above and yet is of a size that is comparable to pocket sized cameras that are presently available.

SUMMARY OF THE INVENTION

According to the invention, there is provided an apparatus for recording and generating images, the apparatus comprising
  a printing unit that comprises
  a carrier that is dimensioned to approximate a PCMCIA memory card, a media supply being receivable in the carrier;
  a page width print head assembly that is mounted in the carrier to print images on the media, the page width print head assembly including at least one print head chip and a suitable printing microprocessor that is configured to control operation of the print head chip;
  an ink supply mechanism that is operatively arranged with respect to the print head assembly to supply the print head assembly with ink; and
  a media feed mechanism positioned in the carrier to feed media to and from the print head chip; and an image recordal apparatus that comprises
  a housing in which the carrier is received, the housing being dimensioned to define a sleeve for the carrier so that at least half the carrier is received in the housing;
  an image sensing device that is positioned on the housing to sense an image to be generated; and
  an image sensing microprocessor that is positioned in the housing and is operatively arranged with respect to the image sensing device to control operation of the image sensing device;

wherein
  both the printing unit and the image recordal apparatus have complementary releasable data connectors so that the image sensing microprocessor can communicate image data to the printing microprocessor of the printing unit.

The invention is now described, by way of example, with reference to the accompanying drawings. It is to be noted that the following specific description is for the purposes of illustrating a particular embodiment of the invention and the manner in which it is to be performed and is not intended to limit the broad scope of the preceding summary.

DETAILED DESCRIPTION OF THE DRAWINGS

Figure 1:
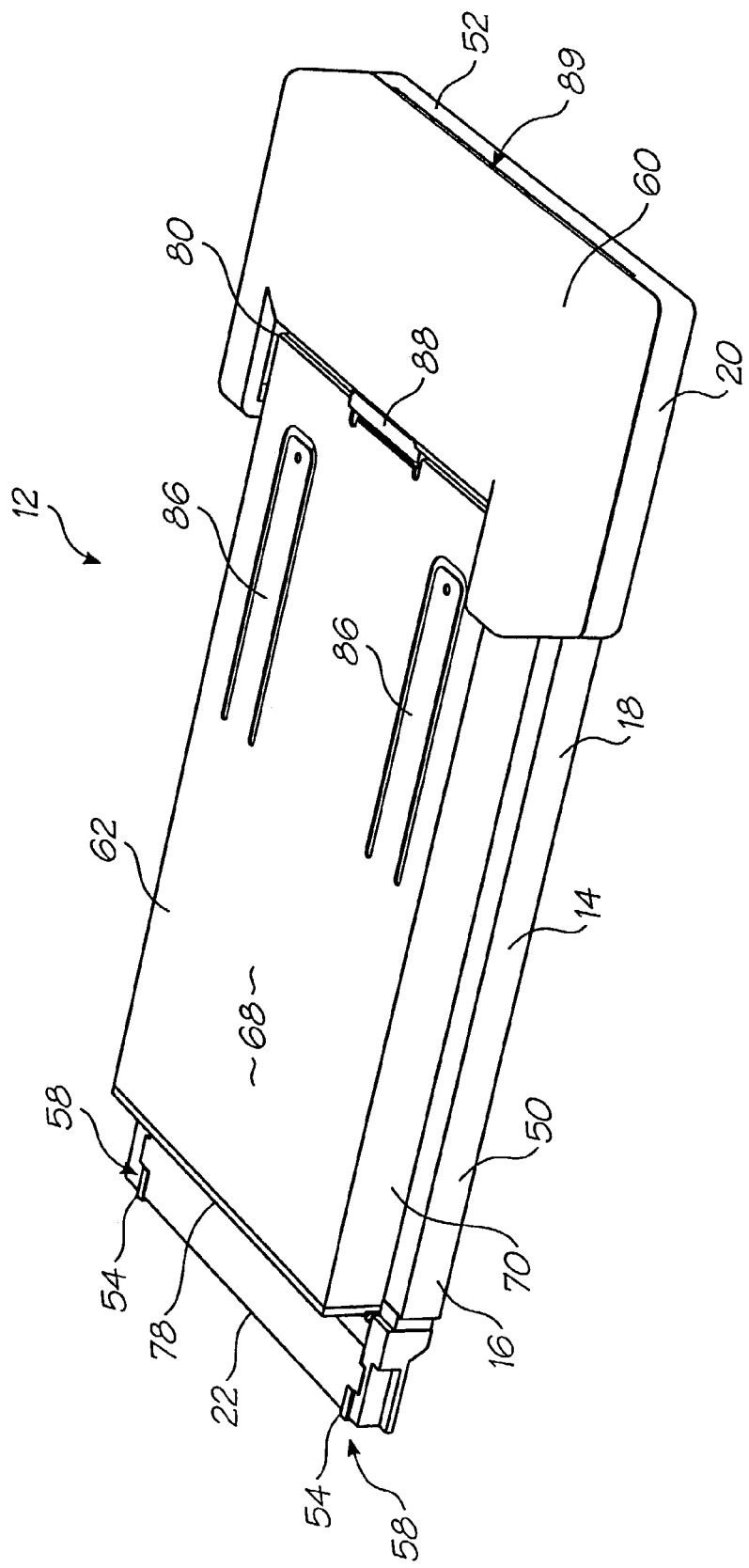
FIG. 1 shows a three dimensional view of a printing unit of an apparatus, in accordance with the invention, for recording and generating images.

In the drawings, reference numeral 10 generally indicates an apparatus, in accordance with the invention, for recording and generating images.

The apparatus 10 includes a printing unit 12. The printing unit 12 has a carrier 14 that is dimensioned so that the printing unit 12 is similar in size to a PCMCIA memory card. In particular, the printing unit 12 is similar in size to a PCMCIA type III card. As is known, PCMCIA is an acronym for Personal Computer Memory Card International Association that sets parameters for PC cards having various sizes. The PCMCIA type III card has a typical size of approximately 86 mm in length, approximately 54 mm in width and approximately 11 mm in thickness.

The carrier 14 includes an elongate, substantially rectangular support structure 16. The support structure 16 includes a body portion 18 with a tray 20 positioned at one end of the body portion 18 and a PCMCIA-type connector 22 positioned at an opposed end of the body portion 18. A print head assembly 24 is mounted on the tray 20. The print head assembly 24 includes a print head 26 that is positioned to span a printing region indicated generally at 28. The print head assembly 24 is shown in some detail in FIG. 4. The print head 26 includes at least one print head chip 27 that is the product of an integrated circuit fabrication technique. Furthermore, each print head chip is described in the above referenced U.S. patent application Ser. No. 09/425,419.

The print head 26 has an ink distribution arrangement 30 mounted thereon. The ink distribution arrangement 30 is described in U.S. patent application Ser. No. 09/922,105, which is incorporated herein by reference. The ink distribution arrangement 30 includes an ink storage and feed structure 29 in fluid communication with a channeling structure 31. The channeling structure 31 is in fluid communication with the print head chip 27 so that ink can be fed to the nozzle arrangements of the print head chip 27. The ink storage and feed structure 29 includes a pair of outer ink reservoirs 33 and a pair of rows of ink storage channels 35 positioned between the outer ink reservoirs 33.

Figure 4:
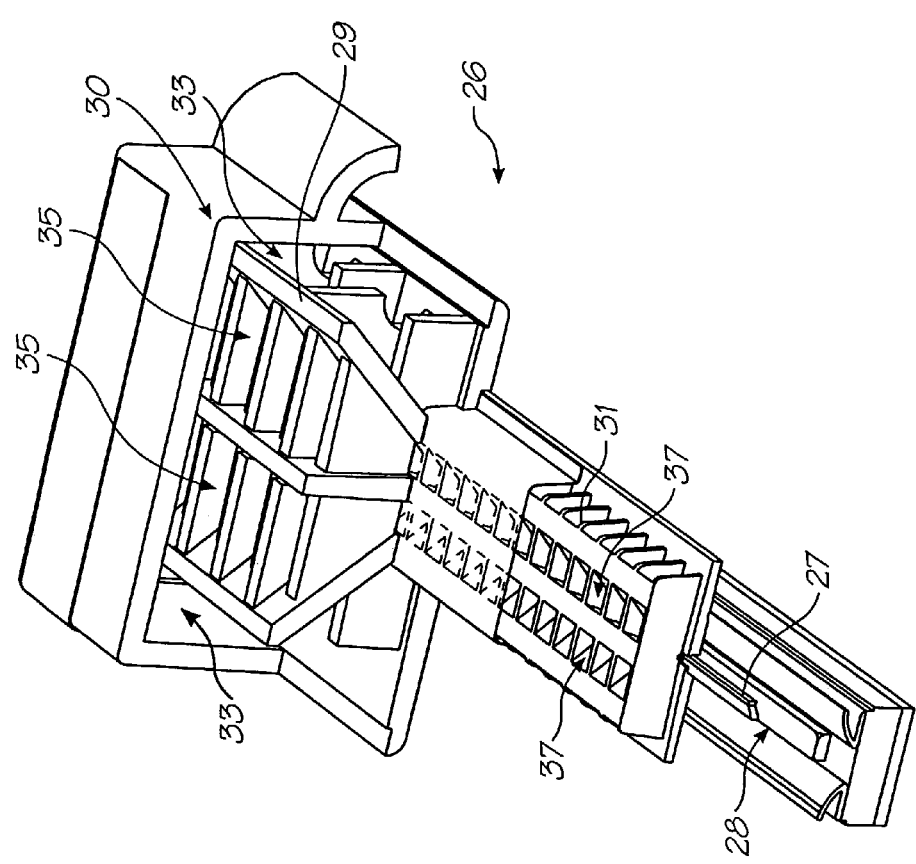
FIG. 4 shows a partly cut away view of a print head of the printing unit of FIG. 1.
Figure 5:
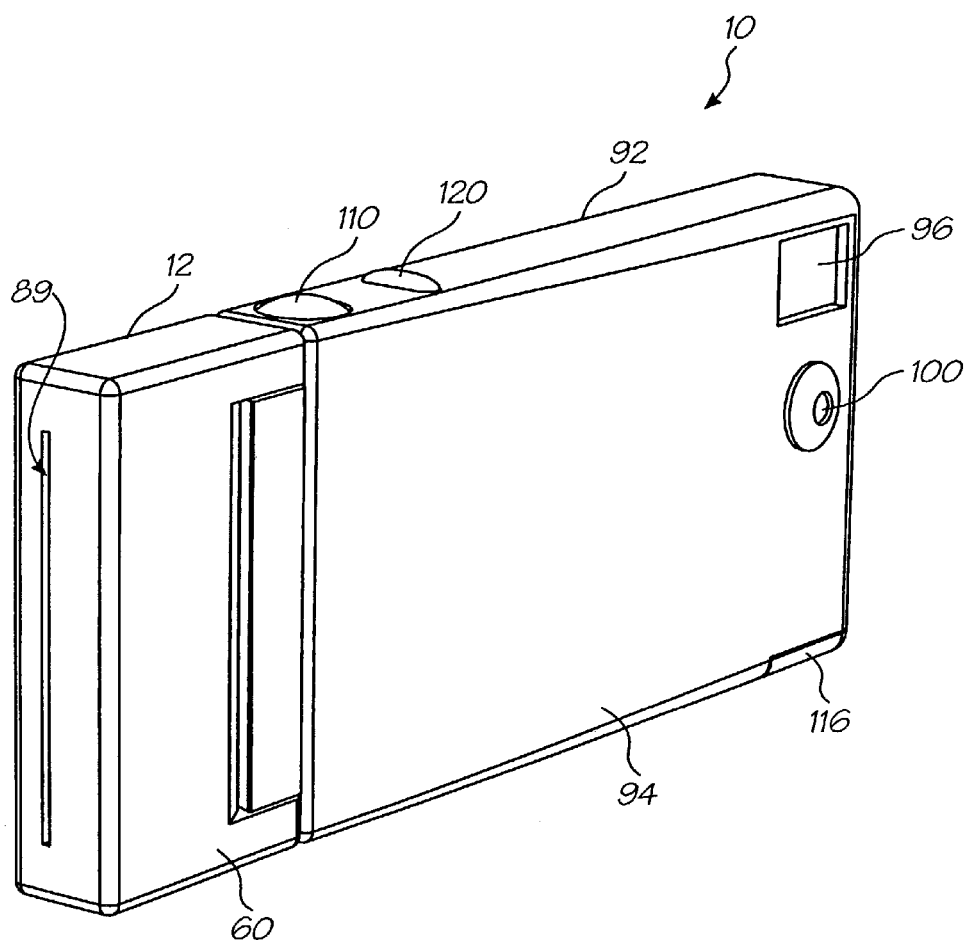
FIG. 5 shows a three dimensional view of the apparatus for recording and generating images.
Figure 6:
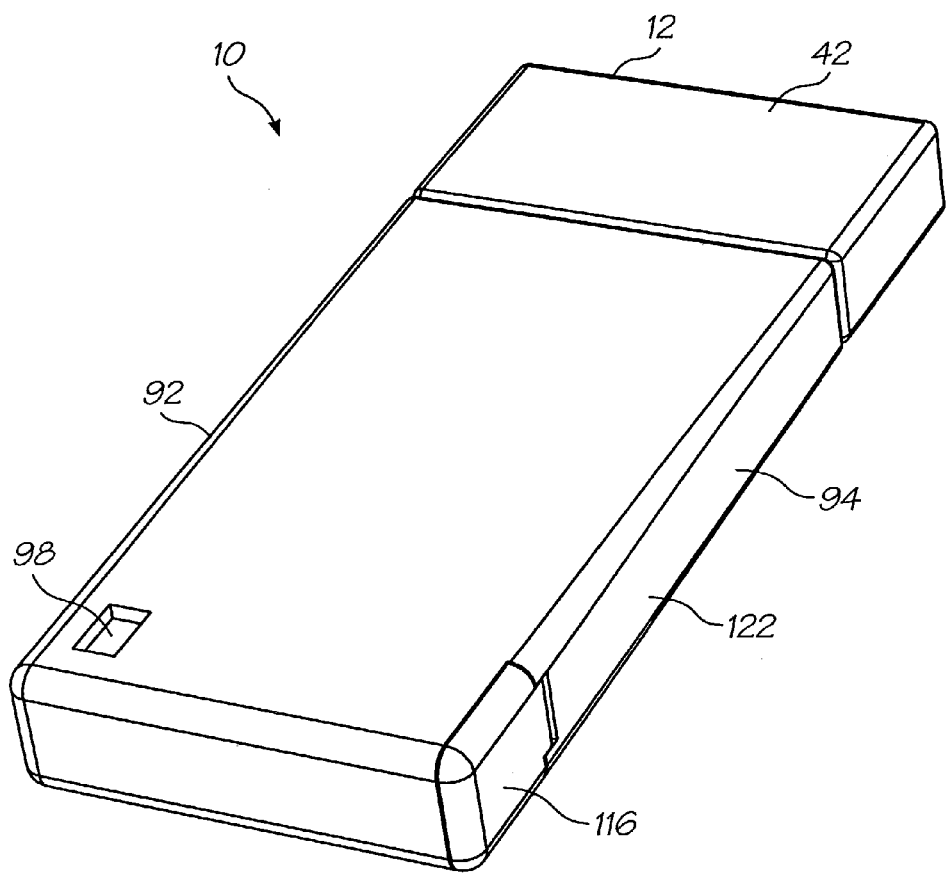
FIG. 6 shows a rear view of the apparatus of FIG. 5.
Figure 7:
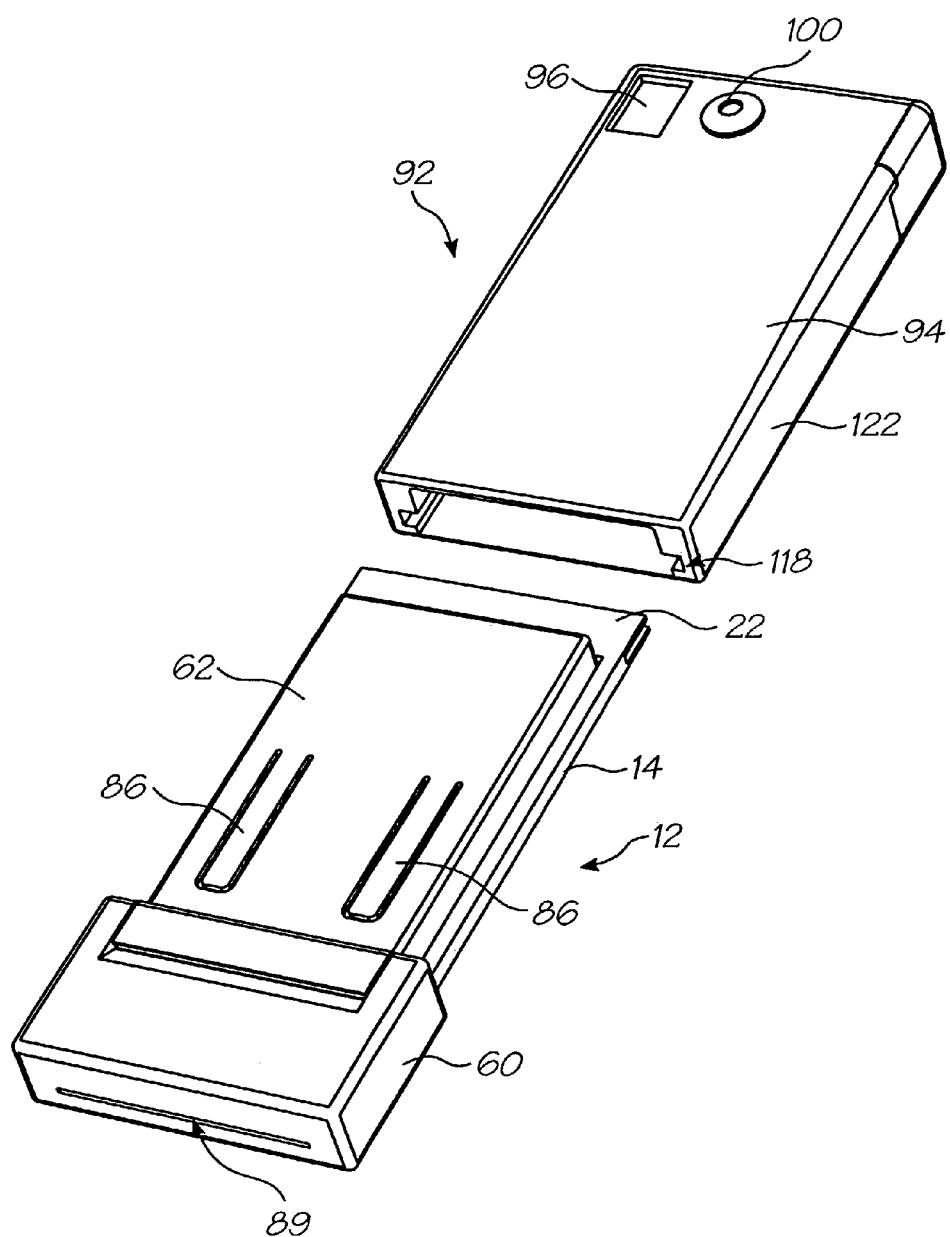
FIG. 7 shows the apparatus of FIG. 5 with the printing unit detached from an image recordal apparatus.
Figure 8:
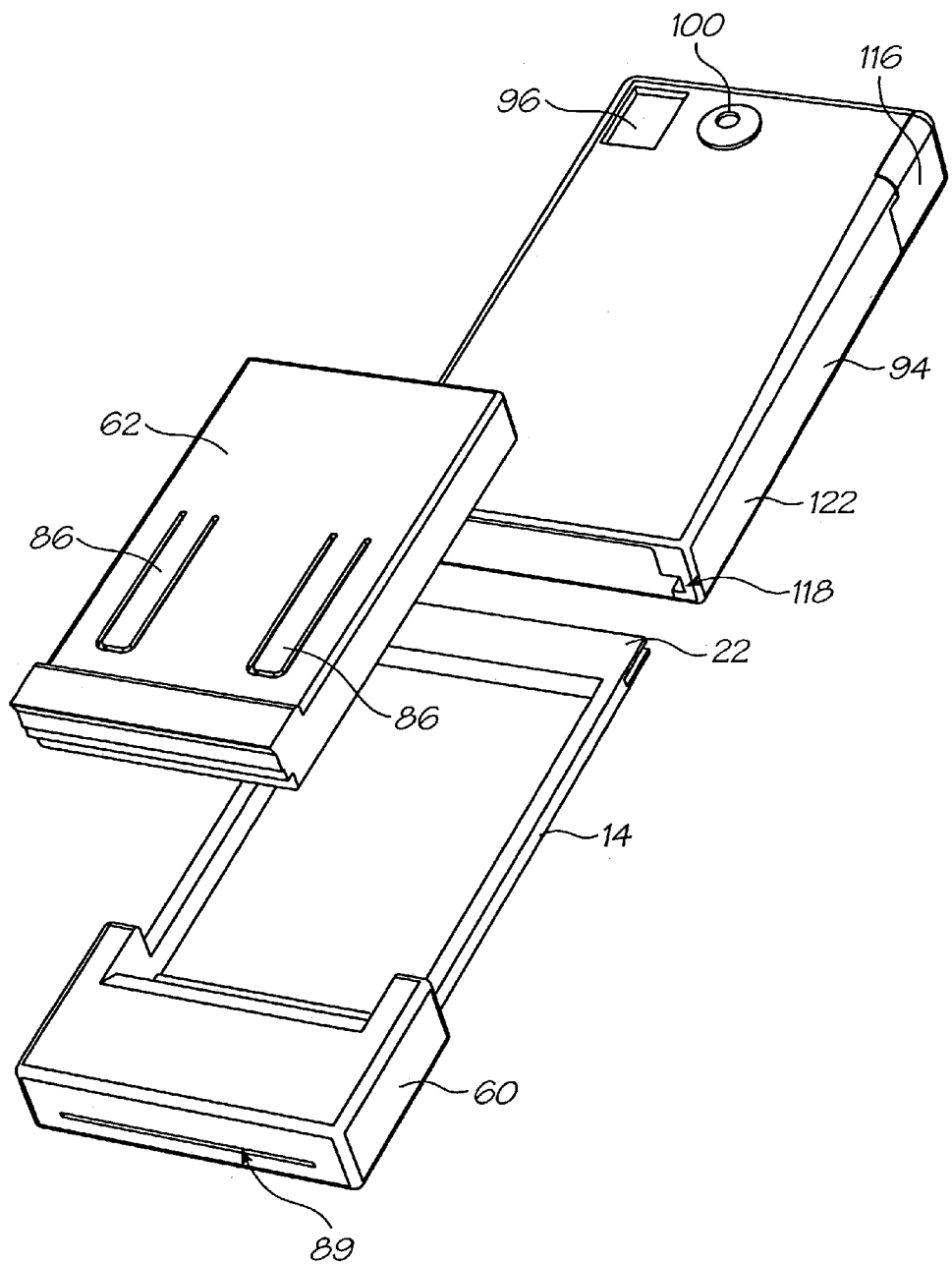
FIG. 8 shows the apparatus of FIG. 5 with a print media cartridge detached from the printing unit.
Figure 9:
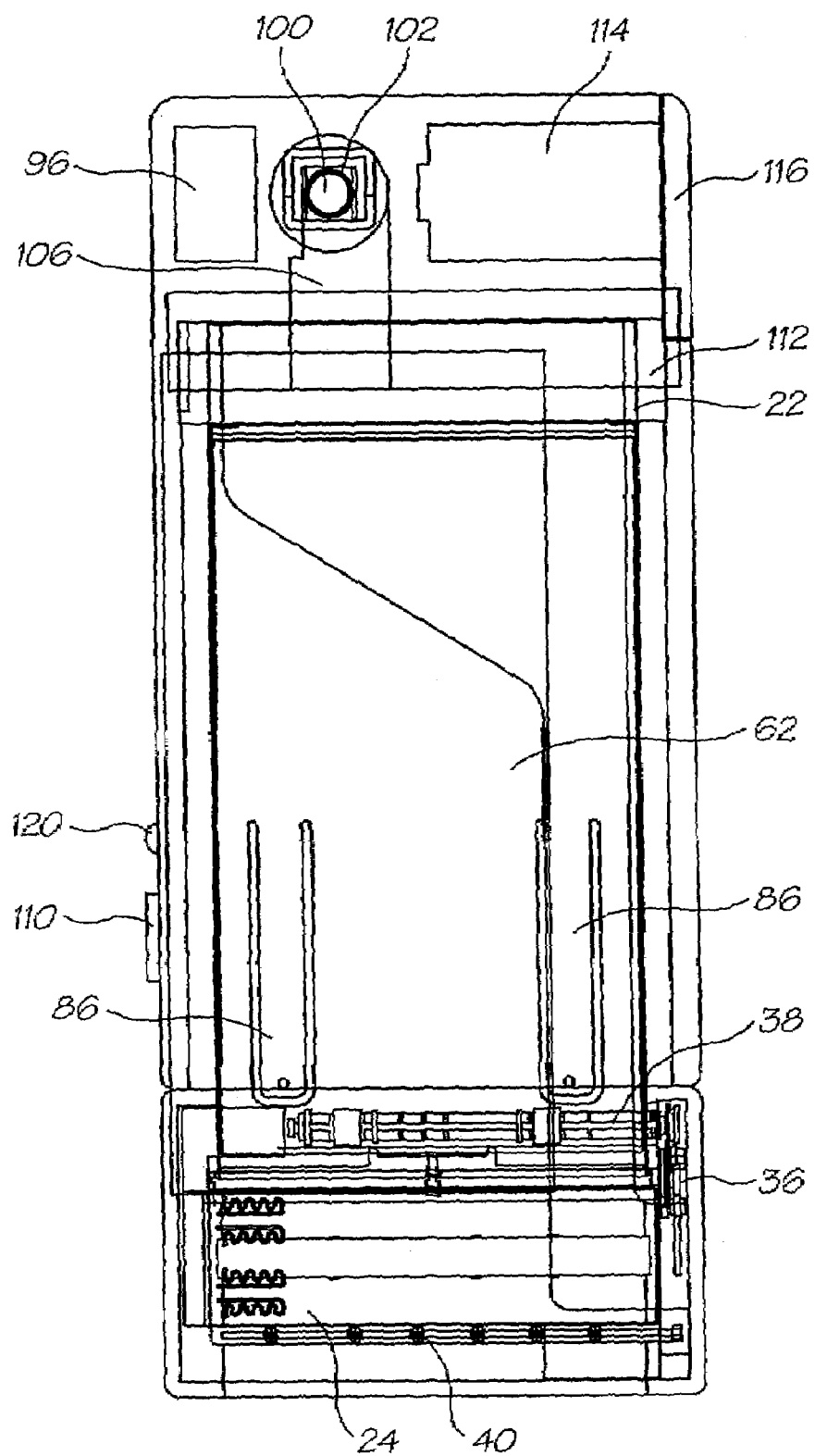
FIG. 9 shows a front view of the apparatus of FIG. 5, indicating the position of some of the components.
Figure 10:
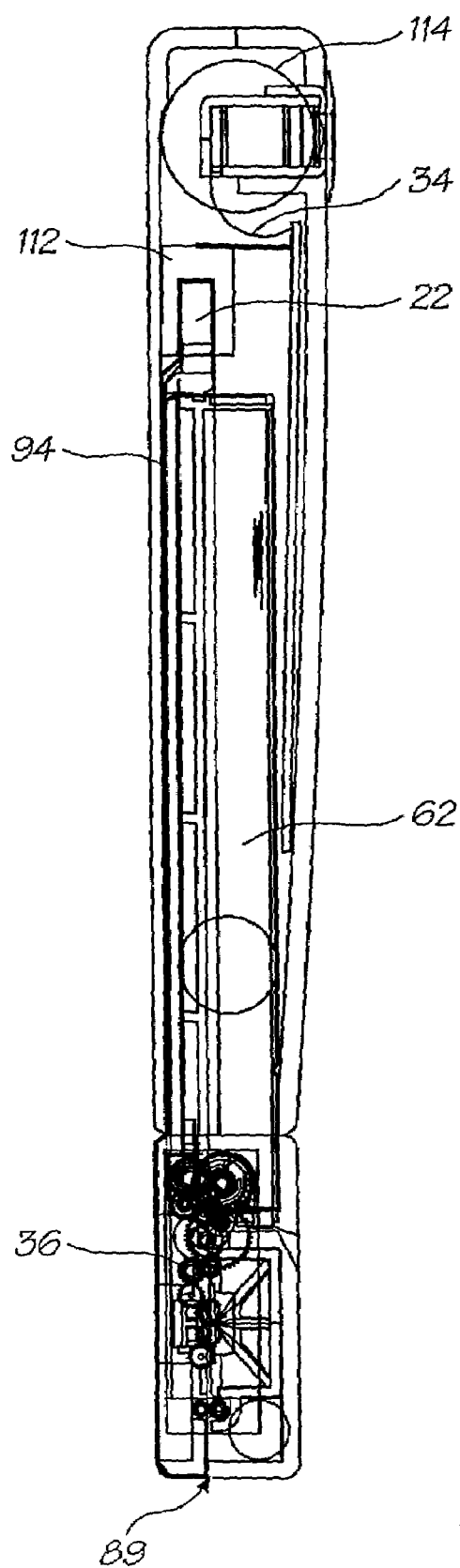
FIG. 10 shows a plan view of the apparatus of FIG. 5 also indicating the position of some of the components.

The channeling structure 31 includes a pair of rows of feed channels 37. Each feed channel 37 is in fluid communication with a respective storage channel 35. As can be seen in FIG. 4, the ink storage and feed structure 29 and the channeling structure 31 together define a plurality of ink feed passages that gradually decrease in cross sectional area as they near the print head chip 27.

The print head assembly 24 includes control circuitry in the form of a microprocessor 32, mounted on the tray 20. Details of a suitable microprocessor are provided in the above referenced U.S. patent application Ser. No. 09/113,053.

The print head assembly 24 further includes a motor 34 that is drivingly connected to a gearbox 36. Operation of the motor 34 and thus the gearbox 36 is also controlled by the microprocessor 32. A primary feed roller 38 is positioned on an infeed side of the printing region 28 and is connected to the gearbox 36 to be driven by the gearbox 36. A secondary feed roller 40 is positioned on an outfeed side of the printing region 28.

The support structure 16 includes a base member 42. The base member 42 includes a feed plate 44 that has a pair of opposed side clips 46 and a front clip 48 positioned thereon. The side clips 46 serve to engage side walls 50 of the body portion 18 and a front side 52 of the tray 20.

A pair of spaced retaining clips 54 are positioned on a rear side 56 of the feed plate 44 to engage complementary formations 58 defined on each side of the PCMCIA-type connector 22.

The printing unit 12 includes a cover member 60 that is mountable over the print head assembly 24 to protect the print head assembly 24.

Figure 2:
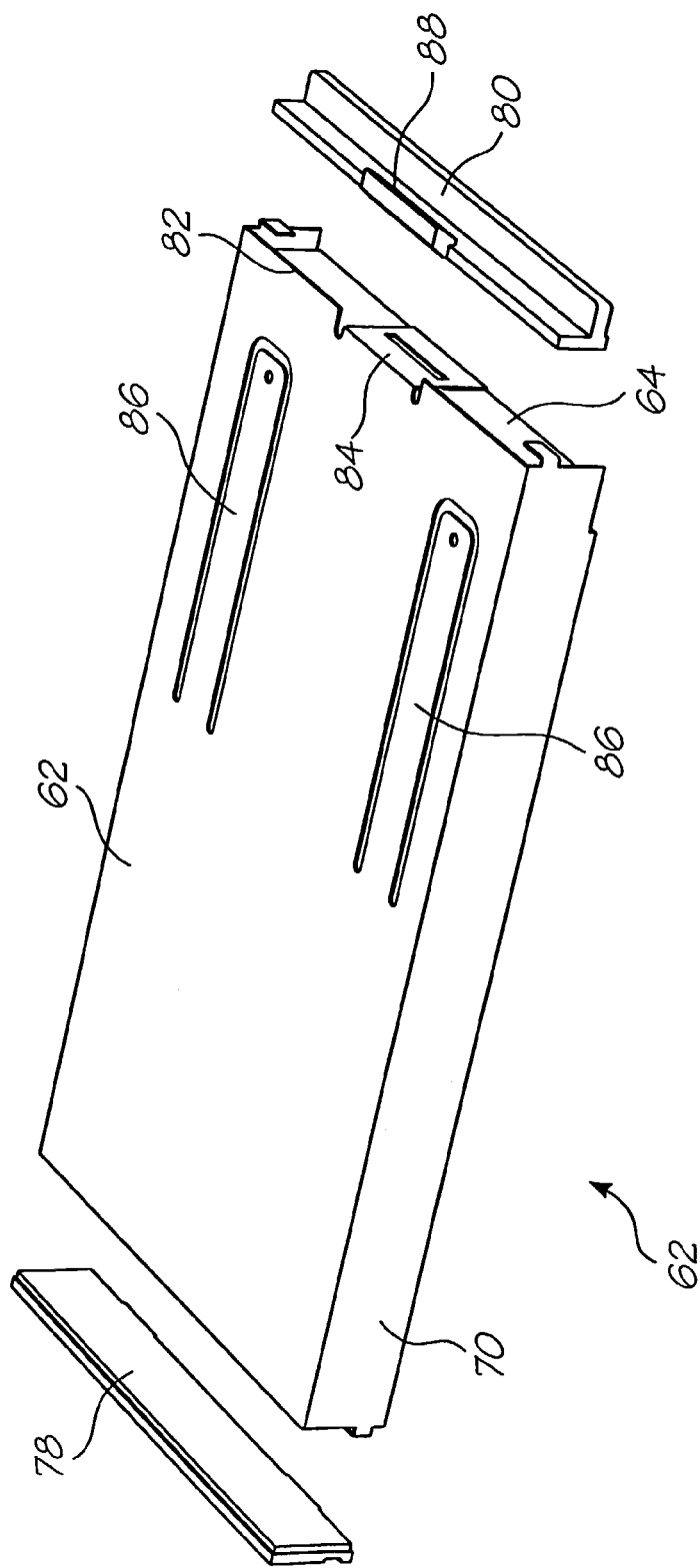
FIG. 2 shows a partially exploded view of a print media cartridge of the printing unit of FIG. 1.
Figure 3:
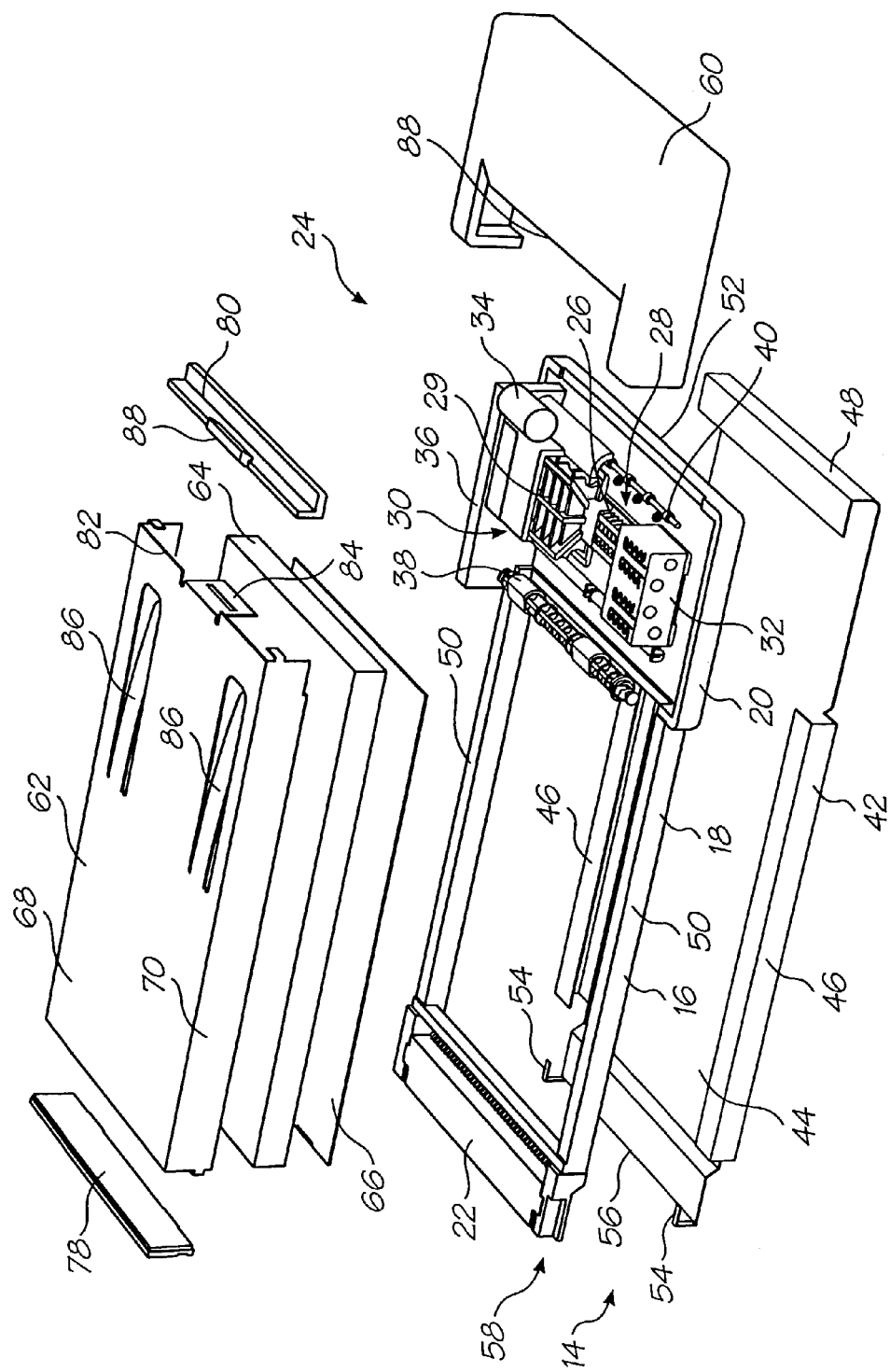
FIG. 3 shows an exploded view of the printing unit of FIG. 1.

A media supply cartridge in the form of a paper sheet cartridge 62 is mountable on the body portion 18. A supply 64 of paper sheets, one of which is indicated at 66, is receivable in the cartridge 62. The cartridge 62 includes a backing plate 68 against which the supply 64 is positioned, in use. Each of a pair of side walls 70 extends from a respective major side of the backing plate 68. A rear cover 78 is mounted on the backing plate 68 and the side walls 70. Further, a front cover 80 is also mounted on the backing plate 68 and the side walls 70. As can be seen in FIGS. 2 and 3, a retaining clip 84 is positioned on a feed end 82 of the backing plate 68. The retaining clip 84 is configured to retain the paper supply 64 in the cartridge 62 as the sheet 66 is fed from the supply 64 into the printing region 28.

The backing plate 68 defines a pair of urging members 86. The urging members 86 are biased so that when the supply 64 is positioned in the cartridge 62, the supply 64 is biased towards the feed plate 44. The front cover 80 and the cover member 60 have complementary engaging formations 88 which allow the cartridge 62 to be urged into engagement with the cover member 60. In this position, the primary feed roller 38 is positioned to engage the sheet 66 so that when the primary feed roller 38 rotates, the sheet 66 is drawn into the printing region 28. The cover member 60 and the tray 20 together define an outfeed slot 89 from which printed sheets are fed.

Figure 11:
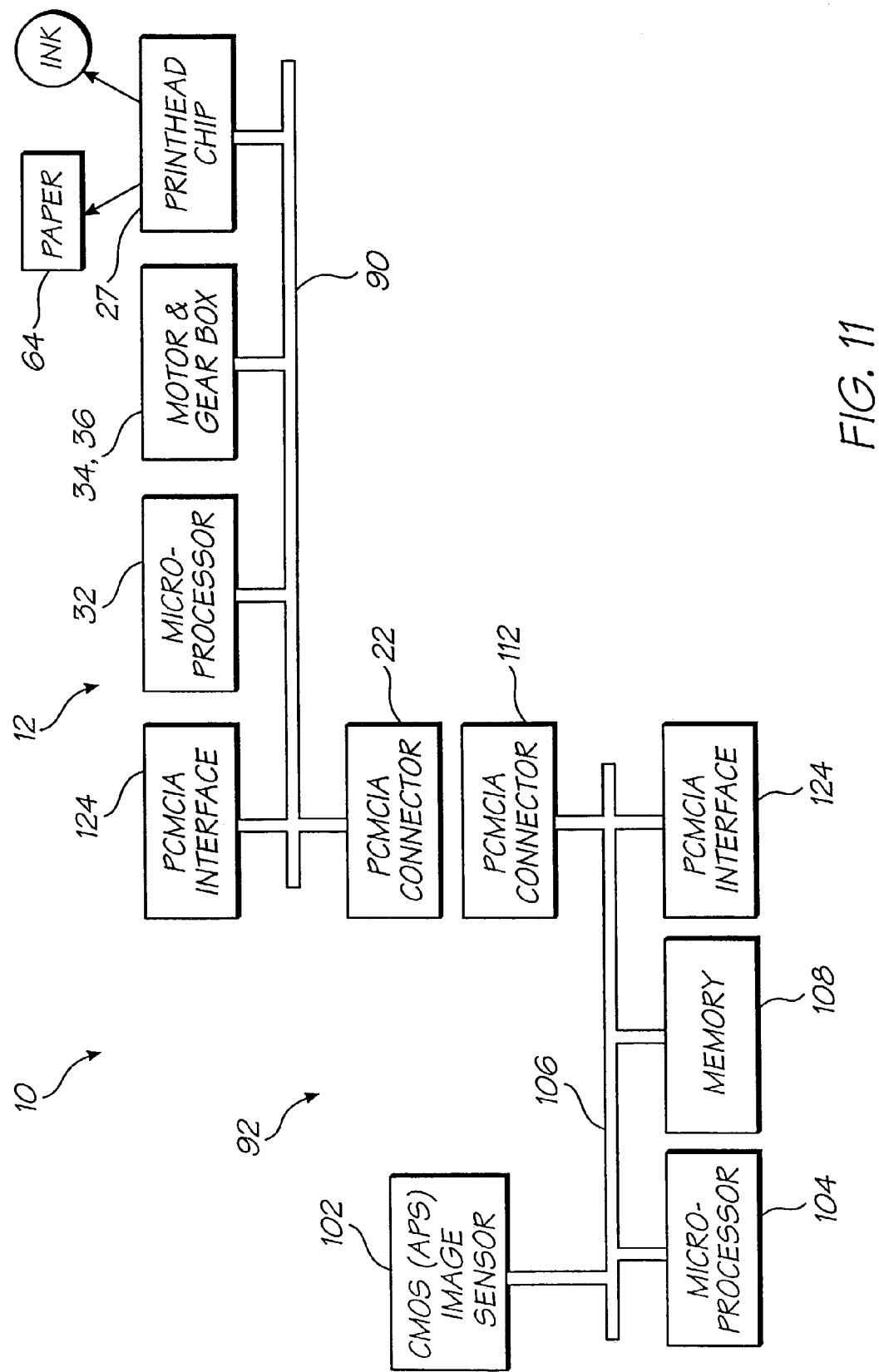
FIG. 11 shows a schematic block diagram indicating the various components of the apparatus of FIG. 5.

The various components of the printing unit 12 are indicated schematically in FIG. 11. As can be seen, the PCMCIA-type connector 22 is connected to the microprocessor 32 with a suitable data bus indicated at 90. The data bus 90 also serves to connect the microprocessor 32 to the print head 26. Thus, image data received by the PCMCIA-type connector 22 can be communicated to the microprocessor 32 which can then control operation of the print head 26 to generate an image on the paper sheet 66.

The apparatus 10 further includes an image recordal apparatus 92. The image recordal apparatus 92 includes a housing in the form of a sleeve 94 in which the printing unit 12 is received up to the cover member 60. As can be seen in the drawings, this means that approximately two thirds of the printing unit 12 is received in the sleeve 94. Further, the cover member 60 and its respective portion of the feed plate 44 is dimensioned to correspond, transversely, with transverse dimensions of the sleeve 94. It follows, therefore, that the apparatus 10 has overall dimensions that are in the region of one third larger than a type III PCMCA-type card. It will readily be appreciated that an article of this size can easily be carried in a pocket of a garment.

The image recordal apparatus 92 has a viewfinder 96 positioned thereon. The viewfinder 96 includes an eyepiece 98 through which a viewer can target an image to be recorded. A camera lens 100 is positioned proximate the viewfinder 96 and is configured to provide a focused image of that which is to be recorded. The camera lens 100 is positioned in front of a CMOS-based image sensing device that, in this example, is in the form of an active pixel sensor 102.

The active pixel sensor 102 is connected to a microprocessor 104 with a suitable data bus 106. The interaction of these components can readily be seen in FIG. 11.

The data bus 106 also serves to connect the active pixel sensor 102 to a memory storage device 108.

Operation of the image recordal apparatus is by way of a camera actuating button 110 that is depressed by a user in a conventional manner. The actuator button 110 is connected to the microprocessor 104 so that, upon actuation, the processor 104 communicates a command signal to the active pixel sensor 102 to capture the desired image. Data carrying this image is then stored in the memory storage device 108.

Operation of the printing unit 12 is by way of a printer actuating button 120 that is connected to the printing microprocessor 32. The microprocessor 32 actuates operation of the print head assembly 24 when the button 120 is depressed so that the recorded image can be printed.

Details of the operation of the image recordal apparatus are set out further in U.S. application Ser. No. 09/113,053, incorporated above. It follows that further details of the operation of the image recordal apparatus will not be described in this specification.

The image recordal apparatus 92 includes a complementary PCMCIA-type connector 112 that is positioned in the sleeve 94 to engage the PCMCIA-type connector 22 when the printing unit 12 is inserted into the image recordal apparatus 92.

The data bus 106 also serves to connect the microprocessor 104 and the memory storage device 108 to the complementary PCMCIA-type connector 112 so that data relating to the captured image can be sent to the microprocessor 32 of the printing unit 12.

Both the printing unit 12 and the image recordal apparatus 92 include a PCMCIA connector interface 124 to control the transfer of data across the PCMCIA-type connectors 22, 112.

A battery indicated at 114 received within the sleeve 94 provides energy for the operation of the various components of the apparatus 10. A battery cover 116 is provided to secure the battery 114 in the sleeve 94. Opposed minor side walls 122 of the sleeve 94 have guide formations 118 defined therein. The side walls 50 of the body portion 18 are slideably received in respective guide formations 118 to facilitate interconnection of the printing unit 12 and the image recordal apparatus 92.

The Applicant believes that the invention provides a means whereby a compact image recordal device or camera incorporating a printer can be achieved. In particular, the device is only between approximately 30 and 40 per cent larger than a PCMCIA type III memory card. This has been perceived by the Applicant to be a significant advantage based on the popularity of pocket-sized cameras.

I claim:

1. An apparatus for recording and generating images, including a printing unit and an image recordal apparatus, said printing unit including:
   a carrier that includes a portion that conforms to the dimensions of an industry standard computer accessory card, a media supply being receivable in the carrier;
   a pagewidth printhead assembly mounted on the carrier to print images on the media, the pagewidth printhead assembly including at least one printhead chip and a printing microprocessor that is configured to control operation of the printhead chip;
   an ink supply that supplies the printhead assembly with ink; and
   the carrier includes a media feed mechanism that feeds media to and from the printhead chip; and
   said image recordal apparatus including;
   a housing in which the carrier is received, the housing being dimensioned to define a sleeve suitable for the carrier and suitable for an industry standard computer accessory card;
   said housing includes an image sensing device; and
   said housing includes an image sensing microprocessor that controls operation of the image sensing device,
   wherein the image recordal apparatus has releasable data connectors complementary with data connectors on the printing unit and complementary with data connectors on an computer accessory card.

2. An apparatus as claimed in claim 1, in which the carrier includes an elongate, substantially rectangular support structure, with the page width print head assembly and the ink supply mechanism being mounted on an end portion of the support structure and the media feed mechanism being positioned intermediate the end portion and a remaining portion of the support structure.

3. An apparatus as claimed in claim 2, in which the carrier includes a media cartridge that is releasably mounted on said remaining portion of the support structure.

4. An apparatus as claimed in claim 3, in which the media cartridge is configured to hold sheets of media.

5. An apparatus as claimed in claim 4, in which the media feed mechanism is in the form of a roller feed mechanism that is configured to be engageable with a lowermost sheet of media in the cartridge when the cartridge is positioned on the support structure.

6. An apparatus as claimed in claim 1, in which the printing unit includes a data bus connected across the complementary data connector of the printing unit, the printing microprocessor, the print head assembly and the media feed mechanism.

7. An apparatus as claimed in claim 1, in which the image sensing device is in the form of a CMOS device that defines an active pixel sensor.

8. An apparatus as claimed in claim 1, in which the image recordal apparatus includes a data bus connected across the image sensing device, the image sensing microprocessor and the complementary data connector of the image recordal apparatus.

9. The apparatus of claim 1 wherein said industry standard computer accessory card is a PCMCIA standard card.

10. An apparatus as claimed in claim 1, in which the data connectors of the image recordal apparatus and the printing unit are both in the form of PCMCIA-type connectors.

* * * * *